United States Patent [19]

Bodkin

[11] Patent Number: 4,979,070
[45] Date of Patent: Dec. 18, 1990

[54] AUTOMATIC RESET CIRCUIT FOR GFCI

[76] Inventor: Lawrence E. Bodkin, 1149 Molokai Rd., Jacksonville, Fla. 32216

[21] Appl. No.: 365,520

[22] Filed: Jun. 13, 1989

[51] Int. Cl.⁵ .............................................. H02H 3/16
[52] U.S. Cl. ...................................... 361/42; 361/46; 361/50; 340/650; 324/510
[58] Field of Search ....................... 361/42, 45, 46, 49, 361/50, 58; 340/650, 651; 324/509, 510

[56] References Cited

U.S. PATENT DOCUMENTS

| | | | |
|---|---|---|---|
| 4,618,907 | 10/1986 | Leopold | 361/45 |
| 4,649,454 | 3/1987 | Winterton | 361/50 |
| 4,707,759 | 11/1987 | Bodkin | 361/45 |
| 4,853,821 | 8/1989 | Lewis | 361/58 |

Primary Examiner—Todd E. Deboer
Attorney, Agent, or Firm—Arthur G. Yeager

[57] ABSTRACT

When equipped with this improvement, a Gound Fault Circuit Interrupter will continue to monitor its protected circuits after tripping and automatically reset itself to restore power when no fault conditions are detected or when detected faults do not exceed a predetermined conduction level and are determined to be non-hazardous. The reset circuit shunts the tripped GFCI relay to pass a safely limited test current into the otherwise disconnected circuits of electrical utilization devices to determine the absence or the extent of fault conditions and is substantially fail-safe in regard to its own function. Four of the embodiments show the circuit as incorporated into the circuitry of an electrically resettable GFCI and a fifth as contained within an attachable enclosure.

23 Claims, 5 Drawing Sheets

AUTOMATIC RESET CIRCUIT FOR GFCI

BACKGROUND OF THE INVENTION

The Ground Fault Circuit Interrupter has undergone steady improvement in regard to achieving increased reliability and lower cost since its introduction as a major factor in the field of electrical safety. Only the continuing need for its manual resetting remains as a substantial deterrent to universal acceptance.

This invention relates to improvement of Ground Fault Circuit Interrupter function by safely eliminating this need for manual resetting, which is particularly objectionable wherein tripping of the GFCI may be due to brief transient faults or those line and load characteristics which are capable of tripping the GFCI device, but which do not constitute true faults. Where load circuits may be infrequently attended by personnel, the problems created by the need for manual resetting after unwarranted tripping become extreme and GFCI protection cannot be afforded due to the possibility of prolonged periods in which critically needed devices such as freezers, pumps, etc., would be unnecessarily put out of service. Manual resetting has been required in the interest of consumer safety to give personnel the opportunity to assess a possible fault situation before attempting reset which causes at least a momentary re-energizing of the load circuit.

The automatic reset feature in accordance with the herein disclosed invention accomplishes a determination of hazardous fault conduction level without repeating the original fault current flow which may have been very large, far beyond the tripping level required for the GFCI, and limited only in duration by the tripping time of the GFCI. The automatic reset circuit not only eliminates unwarranted down time, but employs a safer procedure than that involving the manually operated reset switch which requires that the power circuit be experimentally re-energized to confirm or deny the presence of a less than obvious fault. The fault current sensitivity of the automatic reset circuit may be made slightly more or considerably more than that of the GFCI it controls in accordance with the level of concern for safety in individual situations. A power circuit tripped by a fault of slightly more than 5 ma, for example, may thus be kept off in the presence of a continuing fault with an impedance that would permit a current flow of 4 or 3 or even as little as 2 ma under energized load circuit conditions. With automatic reset capability, standards for sensitivity to initial tripping in the GFCI circuit may also be increased to 4, or even 3 ma, for additional protection against the hazard of ground faults without increases in the losses and inconvenience of unwarranted down time since power circuits would be automatically and immediately restored if unwarranted tripping should occur. Test switches may be located in positions remote from the GFCI, temporarily connecting a resistance from the line to a grounding lead in a tool or appliance, to provide convenience and motivation for more frequent testing and optional on-off switching by UFCI control.

The Ground Fault Circuit Interrupter as referred to herein is the conventional device designed to supply A.C. power from a line source to a load circuit, and to interrupt said power in response to detected ground faults in the load circuit which create a difference between current level in the hot conductor and the return, or neutral conductor, due to passage of current from the load circuit to ground by a path other than that provided by the return, or grounded neutral conductor. Such current differences are made evident for detection by the generation of current in a differential current transformer surrounding both conductors (also variously called a core balance current transformer and a zero sequence current transformer). Only one such transformer is shown to simplify GFCI representation, although a second is commonly employed to detect neutral to ground faults.

The Ground Fault Circuit Interrupter as referred to herein more specifically refers to the electrically resettable type of the above described GFCI which is equipped with a normally closed reset switch through which power is supplied to its control module and wherein reset is accomplished in the absence of a hazardous fault by first opening the switch to interrupt power to the module and then closing the switch to restore power to the module. Interruption and restoration of power to the entire GFCI unit also functions to accomplish reset in this type of unit as differentiated from the type in which the reset button is a physical extension of a solenoid tripped switch. Tripping current is supplied by the GFCI circuit, but manual contact closure is required for resetting. The automatic reset circuit consists of a controlled reset switch connected in place of, or in series with, the standard reset switch, or between the power source and the GFCI, a current limited ground-fault sensing device, a coupling means between the controllable switch and the fault sensing device which may be variously an emission path, a conductive connection, a magnetic path, or other means of physical influence, and a means of assuring an initial opening of the controllable switch. While it is recognized that the current limited ground-fault sensing device when integrated into the GFCI circuitry may be coupled in a manner that affects a reset without simple and obvious connection to reset switch terminals, it is felt that the conventional reset procedure requiring initial break and subsequent make now made available at the switch terminals is a valuable one, affording certain fail-safe advantages and should be retained.

After tripping of the GFCI, the reset circuit is first opened by a fault of sufficient extent or by a momentary fault simulating current which is generated at the tripping of the GFCI to interrupt current across the reset terminals. If the load circuit possesses a true fault and passes test current from the reset circuit to ground that exceeds a predetermined level, and thus corroborates or confirms the cause of tripping as a hazardous fault condition, the reset circuit will remain open as long as the fault persists, and the GFCI will not be reset until the fault is cleared; however, if the predetermined level of current flow to ground does not exceed the predetermined amount, the reset circuit immediately closes, restores current flow across the reset terminals, and resets the GFCI to restore power to the load circuit. If the automatic reset circuit should fail closed, or become insensitive to fault for any reason and not respond to either a fault or the momentary simulated fault in opening the reset switching circuit, the continuous conductivity after tripping will keep the GFCI in the off-state. If the automatic reset circuit should fail open, the continuous interruption after tripping will also maintain the GFCI in the off-state, and in most embodiments would cause the GFCI to switch off simultaneously with the failure. These factors comprises a considerable fail-safe assurance of functioning in regard to the automatic reset circuit.

SUMMARY OF INVENTION

In a generalized first embodiment, the automatic reset circuit is shown to consist of four elements. As a first element, there is a device for low current detection of a ground-fault which is capable of determining fault impedance and of discriminating between impedances which would permit dangerous current flow under energized power circuit conditions and impedances which would not permit dangerous current flow under energized power circuit conditions in accordance with predetermined and established criteria.

The circuit consists, as a second element, of a controlled reset switching device, controlled by the low current level fault detection device which is connected in the generalized and three of the more specific preferred embodiments, across the reset switch terminals of the GFCI in place of the conventional normally closed push button reset switch, or as an alternative, in series with it. In these instances, it may be incorporated into the GFCI circuitry and included within its enclosure.

A third element is a coupling means which may be variously an emissive path, a direct conductive connection, a magnetic field, or other means through which the first element can exercise control of the second.

The circuit consists, as a fourth element, of a means that will simulate a brief fault condition that will either cause or briefly maintain an open state in the second or reset switching element, and thus open the reset switching circuit of the GFCI sufficiently for resetting. The fourth element is required when the cause of tripping does not include a fault of sufficient magnitude an/or duration to assure an effective initial opening of the second element or switching device.

In a more specific second embodiment, the circuit includes, in the low current level fault detection element, a neon or other low current light source in series with a current limiting resistance and a rectifier which shunts the contacts of the GFCI relay to pass a minute test current from the power source to the load. When the contacts of the GFCI relay on the hot side of the power circuit are closed, the neon circuit is shorted out and when the contacts of the GFCI relay are open, a fault condition in the load circuit will provide a path to ground for the neon circuit and cause it to be energized. Light emitted from the energized neon is transmitted by the emissive path of the third element coupling means to the second element which is shown in this instance as an SCR or similar solid state switch with a variable resistance connected between its anode and gate and a photo conductive cell connected between its gate and cathode so that light above a predetermined level causes the second or switching element to greatly reduce conduction and effectively interrupt the current across the reset terminals.

The fourth element, or momentary ground-fault simulator, includes a capacitance which provides a brief initial path to ground for the rectified current from the source through the neon which is then blocked when the capacitor becomes charged. The capacitor is maintained with an opposite charge prior to the opening of the GFCI relay contact to maximize and standardize the effect. The brief emission from the neon reaches a photosensitive portion of the second or switching element and causes the switching element to become effectively non-conductive. If no fault conduction of a predetermined hazardous level provides a continuing path to the ground, the switching element becomes closed or conductive and the GFCI is reset. If a path to ground of a predetermined hazardous level persists, the neon continues to be energized to an extent that emission reaching the photosensitive portion of the switching element will cause it to remain open, or to keep current to the GFCI control circuit below a critical level so that the GFCI is not reset until such time as the fault is cleared and neon emission level permits the switching element to close or to pass current sufficient for reset.

The circuit includes, in a more specific third embodiment, and in the first element for low current detection of ground fault, the gate connected control circuit of an SCR or similar solid state switch consisting of a rectifier connecting the gate of the switching element to its anode, a resistance and capacitor connected in parallel between the gate and anode by a contact pair of the GFCI relay, and a capacitor connected between the gate and cathode of the switching element. Again, in this instance, the SCR is the second or controlled switching element and is connected across the reset terminals of the GFCI. As in the first described embodiment, a fault condition in the load circuit when the GFCI has disconnected it from the power source will provide a path to ground and when impedance of the path is below a predetermined level considered to be hazardous, the switching element will be rendered substantially non-conductive, or be conductively maintained to hold current below that level necessary for reset of the GFCI. Again, the fourth element includes a capacitor maintained with a charge in one direction to provide a brief path to ground until charged in the opposite direction and cause an interruption of current across the reset terminals of the GFCI by the second or switching element.

In still another more specific fourth embodiment, the arrangement and function of the first, second, and third elements are similar to that of the immediately previous embodiment, but modified first by the re-connection of the parallel connected resistance and capacitance to the anode through normally closed contacts of an additional relay rather than through contacts of the GFCI relay. The coil of the additional relay is connected by a second pair of normally closed contacts to the normally closed contacts of the relay of the GFCI, so that it is connected to the power source only when the GFCI is tripped, and the GFCI relay is not energized. The connection of the said relay coil through the normally closed contact of its own armature causes it to open and close its contacts in buzzer fashion providing audible indication in the event of tripping. It also facilitates the necessary interruption of the connection across the reset terminals and reduces the difference between initial turn-off and maintained turn-off fault sensitivity. In this embodiment, the physical characteristics of the additional relay, with regard to rate of open and close, should be considered in its selection to maximize the effect, but current carrying requirements are very small, and thus contact ratings are generally not critical.

In this instance, the fourth element, or ground fault simulator, is replaced by a relatively high resistance connecting the hot terminal to ground when the GFCI is in the tripped state, which assists in assuring an initially open state in the second element or controlled reset switch.

In a final more specific fifth embodiment, the automatic reset circuit is shown within its own enclosure with sockets and plugs and meant for attachment to a GFCI device, rather than incorporation into a GFCI circuit. The function is similar to that of the second and third described embodiments, except that the solid state switching element or SCR has become a part of the first element low current to a detection of ground fault, and now controls the flow of current to a relay coil which is also a portion of the first element and generates a magnetic field of influence as the third element or control coupling with the second element or switching portion of the relay. The magnetic influence of such a coil and its core could also be made to cause solid state switching by utilizing Hall effect semi-conductors rather than physically movable contacts. In this instance, the interruption and re-establishment of current from the source to the GFCI module required for reset is effected by interrupting and re-establishing current to the entire GFCI unit. The brief initial open state required after tripping is assisted by connection through a resistance to the ground side of the load circuit.

The relay contacts in this embodiment must be sizeable enough to accommodate load current flow, but since the reset circuit relay normally opens its contacts after the GFCI has been tripped and has opened the load current and then closes its contacts before the GFCI closes its relay contacts to close the load circuit, nearly all of the contact erosion associated with arcing is avoided, and contact size may be reduced accordingly.

In this embodiment, the ground connection of the automatic reset device may be normally connected by means of another pair of normally closed relay contacts on the same armature to the grounding or third wire contact in a receptacle, so that the grounding connection is confirmed as intact by initial energizing of the circuit with the connection immediately transferred to the return ground or neutral for normal operation. This arrangement provides a means for confirmation of correct receptacle wiring, and as a means of protecting against reversal of hot and neutral or hot and grounding connections. In this arrangement, a relay must be chosen which offers a rapid transfer from grounding to grounded or neutral in order to avoid de-energizing in transfer and a resultant buzzing rather than positive closure.

Briefly stated, an object of this invention is to provide a means that will provide automatic resetting of an electrically resettable ground fault circuit interrupter in the absence of a fault of hazardous conductive level.

More specifically stated, an object is to provide a means of automatic resetting to restore power to load circuits only in the event of unwarranted false tripping, or upon the clearing of a true fault condition which lead to the tripping, with means of determining fault and of delaying such automatic resetting in the event of a true fault of hazard level so long as it exists, until such time that the said fault condition is cleared or reduced to a non-hazardous level.

A further object of this invention is to provide a safe means of automatic resetting of a GFCI in order that the aggravation of tripping due to transient conditions may be avoided, particularly wherein any appreciable power interruption may have a costly or hazardous effect in the interruption of timely procedures, and in the instance of unattended power circuits where downtime may be greatly extended with results such as destruction of refrigerated foodstuffs, etc.

A further object of this invention is to provide a safer means of confirmation of fault or determination of unwarranted tripping by employing a low current detection means rather than reliance on operator reset judgment when the cause of tripping is less than obvious and determination by re-energizing of the load circuit, in manual resetting, could result in a repetition of the full fault current flow.

A further object of this invention is to provide such additional and valuable features as are herein described at slight additional cost.

BRIEF DESCRIPTION OF THE DRAWINGS

The invention both as to its organization and principles of operation, together with further objects and advantages thereof, may be better understood by reference to the following detailed description of the embodiments of the invention taken in conjunction with the accompanying drawings in which.

DESCRIPTION OF THE PREFERRED EMBODIMENTS

Figure 1:
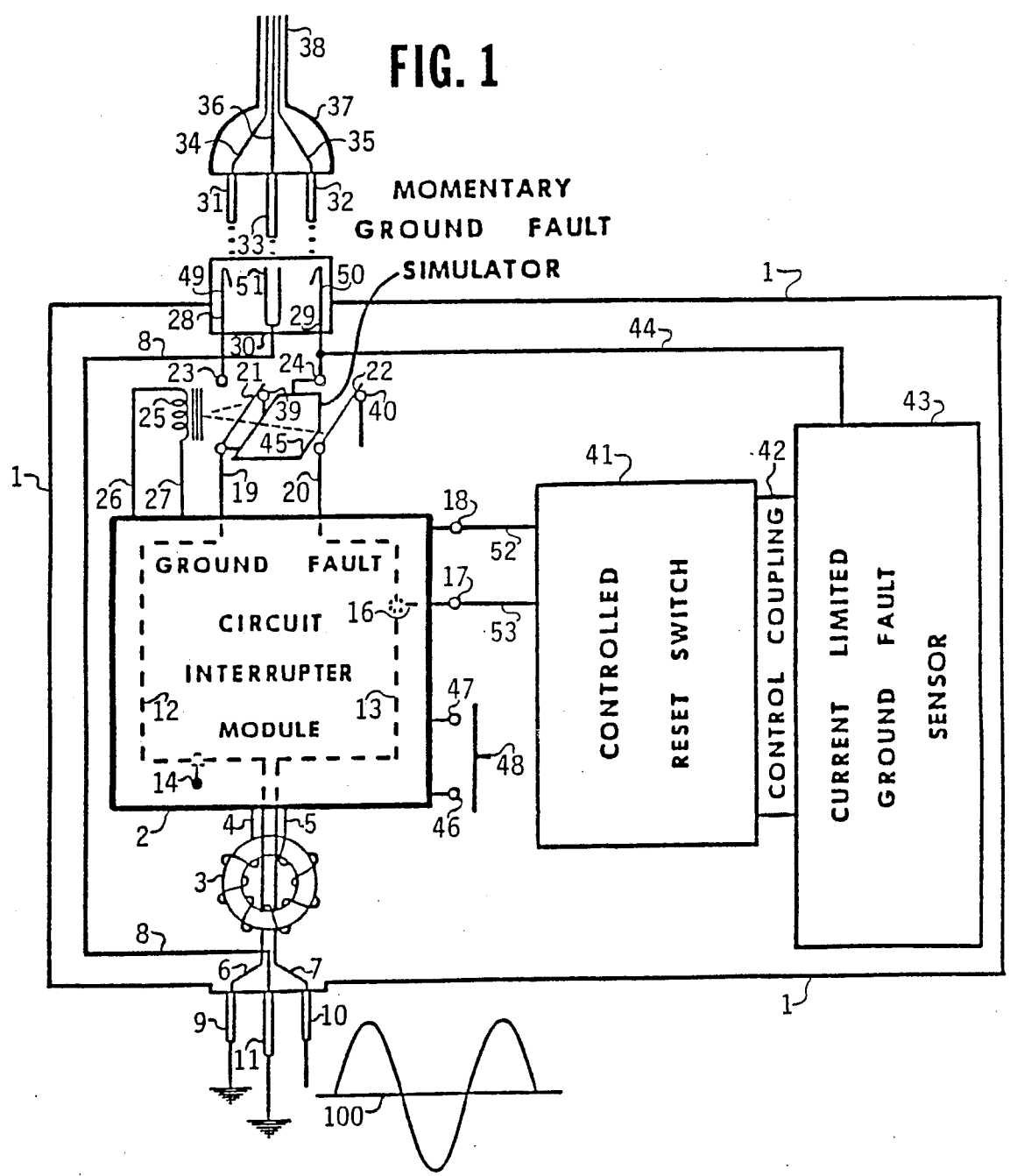
FIG. 1 is a block diagram depicting the arrangement of the four circuit elements in a generalized embodiment, and as employed in the first, second, and third more specific embodiments of FIGS. 2, 3, and 4, respectively.

Referring now to FIG. 1, the circuit illustrated includes a simplified generic representation of a conventional ground fault interrupter housed in enclosure 1 wherein electrical power from A.C. source 100 is supplied to the GFCI circuitry through male plug contacts as follows: hot side contact 10 to lead 7 and grounded neutral contact 9 to lead 6. Grounding contact 11 is connected to a feed through lead 8 which by-passes the GFCI circuitry, and is connected directly to third wire contact 51 of receptacle 30. Leads 6 and 7 are passed through the core of the toroidal differential current transformer 3 which is also called a core balance and zero sequence current transformer. Such a transformer is designed to sense differences in current carried by the said conductors 6 and 7. A difference which can be attributed to a fault current path carrying a portion of the current to ground which should be carried to the source by the return wire or grounded neutral 6. The leads 4 and 5 from the coil of transformer 3 are connected to the ground fault circuit interrupter module 2 for amplification of generated current and subsequent control of current to relay coil 25. Leads 6 and 7 after passage through the core of toroidal transformer 3 feed through the module as respective leads 12 and 13, and emerge, respectively, as leads 19 and 20 which connect, respectively, with relay armature contacts 21 and 22. Feed-through lead 13 also carries current from the hot side of the line from source 100 through lead 16 to reset switch terminal 17. Feed-through lead 12 is connected to the module at 14 to furnish a grounded neutral return path for its circuitry. Current from the hot side is supplied from 17 through contact 18 to the module when the contacts are connected by a reset switch and the module then acts to supply energizing current to coil 25 through its leads 26 and 27, except when a differentially generated signal from transformer 3 indicates a fault, at which time the current to coil 25 is interrupted and it is de-energized. When coil 25 is energized, hot side contact pair 22 and 24 and grounded neutral side and contact pair 21 and 23 close to supply electrical power from source 100 to respective receptacle contacts 50 and 49 through respective leads 29 and 28. When plugged into the receptacle, ground fault protected power from source 100 is supplied to a load circuit which includes leads 35 and 34 carried in plug housing 37 and cable sheath 38 which are connected to hot and neutral contacts 32 and 31 of plug 37 which engage hot and neutral receptacle contacts 50 and 49, respectively. The third wire grounding contact 51 of receptacle 30 engages the grounding prong 33 of plug 37 which is connected to lead 36 carried by cable sheath 38 to supply a grounding means in the load circuit. The test switch terminals 46 and 47 are connected momentarily for testing purposes by normally open switch 48. In many instances of GFCI design the test switch connects a resistance between an ungrounded conductor on the load side such as 29 with a grounded neutral conductor such as 6 before its passage through transformer 3, or with a grounding conductor such as 8. No specifics are depicted in the generalized representation. It should be noted here that the above described portion of FIG. 1 comprising the elements listed as 100 and as 1 through 14, 16 through 44, and 46 through 51, are substantially the same in FIGS. 1 through 5. In the block diagram of FIG. 1 instead of a normally closed reset switch 15, such as that shown only in FIG. 5, a controlled reset switch 41 is shown connected to reset switch terminals 17 and 18 by leads 53 and 52, respectively. The controlled reset switch 41 is shown linked for control to a current limited ground fault sensor 43 by a control coupling 42. The ground fault sensor 43 is shown connected to hot lead 29 by a coupling lead 44 which passes a brief probe or test current into the load circuit when otherwise disconnected from the power source 100 by the de-energizing of relay coil 25 and opening of contacts 22 and 24, and contacts 21 and 23. If a path to ground in the load circuit exists for the test current from the sensor 43, and is above a conduction level predetermined to constitute a hazard, the sensor 43 through control coupling 42 causes the controlled reset switch 41 to open, or to remain open after initial opening caused by momentary ground fault simulator 45.

In accomplishing a reset of the GFCI, the current path across reset switch terminals 17 and 18 must first be broken, and then restored. If a fault causing the GFCI to trip is very brief, the path across the terminals 17 and 18 may be substantially uninterrupted, or interrupted insufficiently for reset purposes, and the continuing current path would cause the GFCI to remain in the off or tripped state in the absence of hazard.

To assure the initial open state after tripping, prerequisite to resetting of the GFCI, the momentary ground fault simulator device 45 is provided. A momentary path to ground of sufficient extent supplied by the ground fault simulator 45, also serves to test the function of current limited ground fault sensor 43, control coupling 42, and controlled reset switch 41, and is preferred to a more direct means of causing an initial open state in the reset switch current path.

In the event that any of the elements fail to the extent that there is no response to the simulated ground fault, and the said current path remains conductive, the ground fault circuit interrupter will not be reset. If the defect causes the said current path to remain open, the GFCI will also not be reset. In either instance, a unit with defective automatic reset circuitry would be kept out of service. If the automatic reset circuit is connected in series with a manually operated reset switch rather than in its place, and the failure is such that the controlled reset switch remains conductive, the manual reset switch may be used to override the automatic device.

Figures 2, 2A:
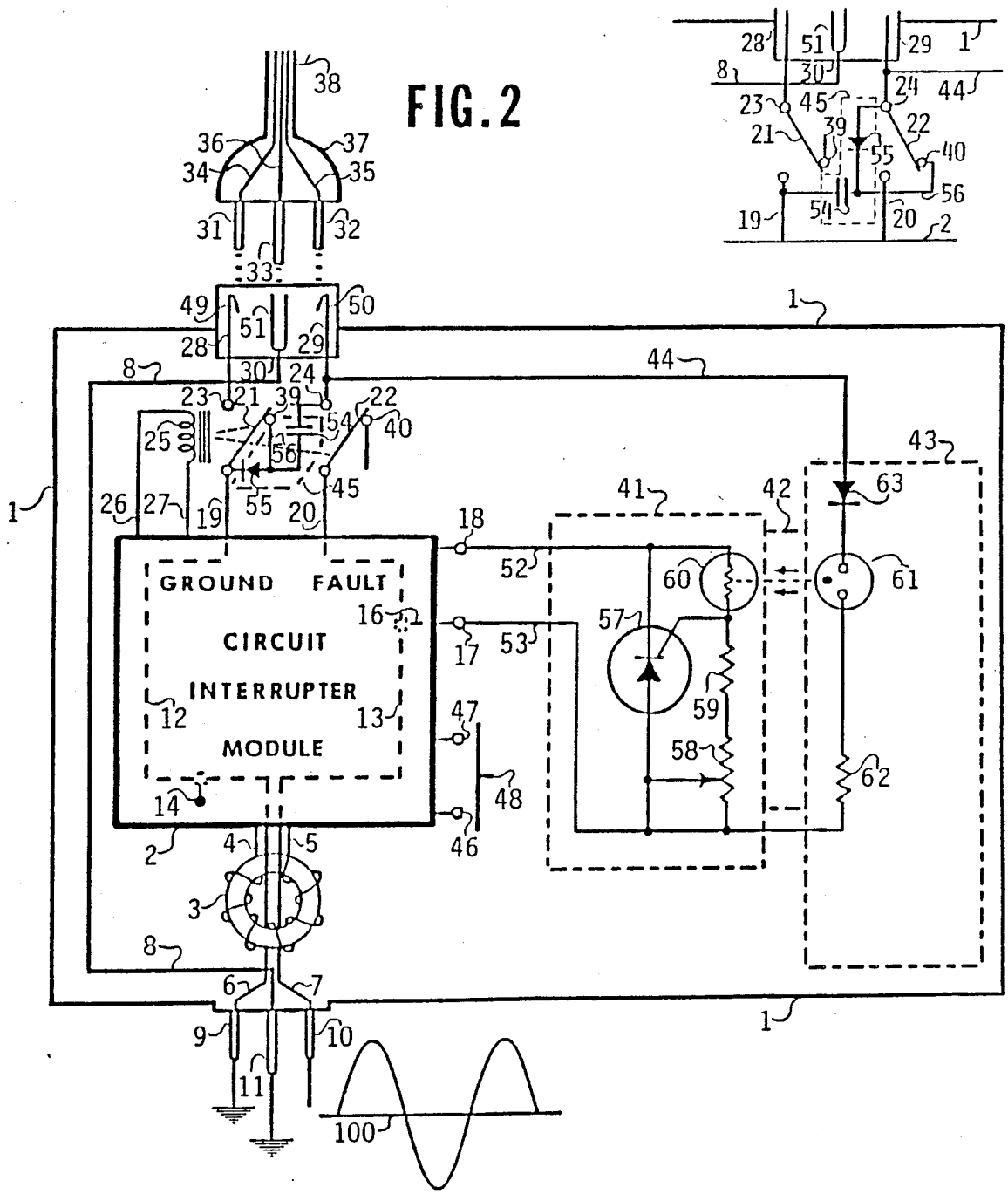
FIGS. 2 and 2A show a schematic diagram of a first more specific embodiment of circuitry to provide a safe incorporated means of providing automatic resetting of a GFCI in accordance with this invention in which the control coupling means is an emission path.

In the more specific embodiment of FIG. 2, the controlled reset switch is shown to comprise an SCR 57 connected between reset switch terminals 17 and 18, by respective leads 53 and 52. Variable resistance 58 and fixed resistance 59 are connected in series between the gate and anode of SCR 57 with photo conductive cell 60 connected between the gate and cathode. A probe or test current supplied from source 100 through terminal 17 and lead 53 is limited by resistance 62, and is passed through neon discharge lamp 61 and rectifier diode 63 before passing into the coupling lead 44 which connects the sensor 43 to lead 29 and thus passes it on to load circuit.

The resistance 62 may be 22K to 220K ohms with readily available NE2H or NE2 lamps, respectively, and while the sensitivity of the automatic reset is shown as being made adjustable only by the variable gate to anode resistance 58 of SCR 57 in the controlled reset switch element 41, it should be understood that resistance 62 may also be made variable to further affect sensitivity to fault by adjustment in the sensor element 43. If a fault path to ground exists in the load circuit after disconnection by the tripped GFCI, current will flow through the lamp 61 of sensor element 43, and the emission path will serve as control coupling 42 wherein the light emitted by fault current flow in the neon of 61 will reach the photo conductor 60 of controlled reset switching element 41 and when sufficient to sufficiently lower the resistance of 60, will cause SCR 57 to interrupt the current path between reset terminals 17 and 18, or to reduce said current flow below a critical level required for GFCI operation. The sensitivity of the reset circuit, determined by selection of components as well as adjustment of variable resistances, should be such as to provide a greater sensitivity to a given fault resistance in sensor 43 after tripping of the GFCI than that exhibited by the GFCI in its tripping, in order to avoid rapid resetting and retripping in the presence of a fault of marginal hazard level. The sensitivity of sensor 43 should not be made overly great, however, or the continuing presence of minor faults below established hazard levels may prevent reset after the fault that caused the tripping has been cleared. The specifics of this adjustment are a matter related to the nature of the appliance and scenario of the application, however, and special circumstances such as those to be found in medical situations may benefit from special levels of "holding" sensitivity after tripping, not only in adjustment of the sensor to delay reset until faults of any appreciable level are cleared, but in increasing the trip sensitivity of the GFCI itself for the greater protection of shock susceptible patients since unwarranted and unnecessary downtime would not be increased due to the automatic reset feature, and power would not be appreciably interrupted, except in the presence of true fault conditions. The more specific embodiment of FIG. 2 also shows the momentary ground fault simulator 45 to comprise a capacitor 54 charged in one direction through rectifier diode 55 during the time relay coil 25 is energized and contacts 22 and 24 are closed, and contacts 21 and 39 are open. When the GFCI is tripped, and coil 25 is de-energized, contacts 22 and 24 are open, and contacts 21 and 39 close to short out rectifier diode 55 through lead 56, so that the capacitor 54 is free to charge in the opposite direction through rectifier diode 63 included in the ground fault sensor 43 and to thus supply to the sensor circuitry a brief pathway to ground as a ground fault simulation. FIG. 2A depicts an alternate means of connecting capacitor 54 and rectifier diode 55 of the momentary ground fault simulator in FIG. 2, so as to utilize the hot side contacts 22 and 40 to short out or shunt rectifier diode 55 rather than the grounded neutral contacts 21 and 39. The combined resistance of 58 and 59 would be typically adjusted between 400K and 1 Megohm and the SCR should be a sensitive gate type rated as having a 200 microampere Igt, 1 to 4 ampere IT(RMS), and 200 Volt or greater VDRM. The value of the capacitor 54 should be 0.033 Mfd to 0.2 Mfd, and should be rated in excess of 250 WVDC.

The photo conductor 60 is typically a 170 volt 0.2 watt cadmium sulphide type, and the minimum resistance is preferably low, in the 100 ohm range, with dark resistance in the 500K ohm range, resistances 58, 59, and 62, should be ¼ to ½ watt and rectifier diodes 55 and 63 are general purpose silicon types rated at 1000 volt PRV and 1 to 2.5 amperes (RMS).

Figure 3:
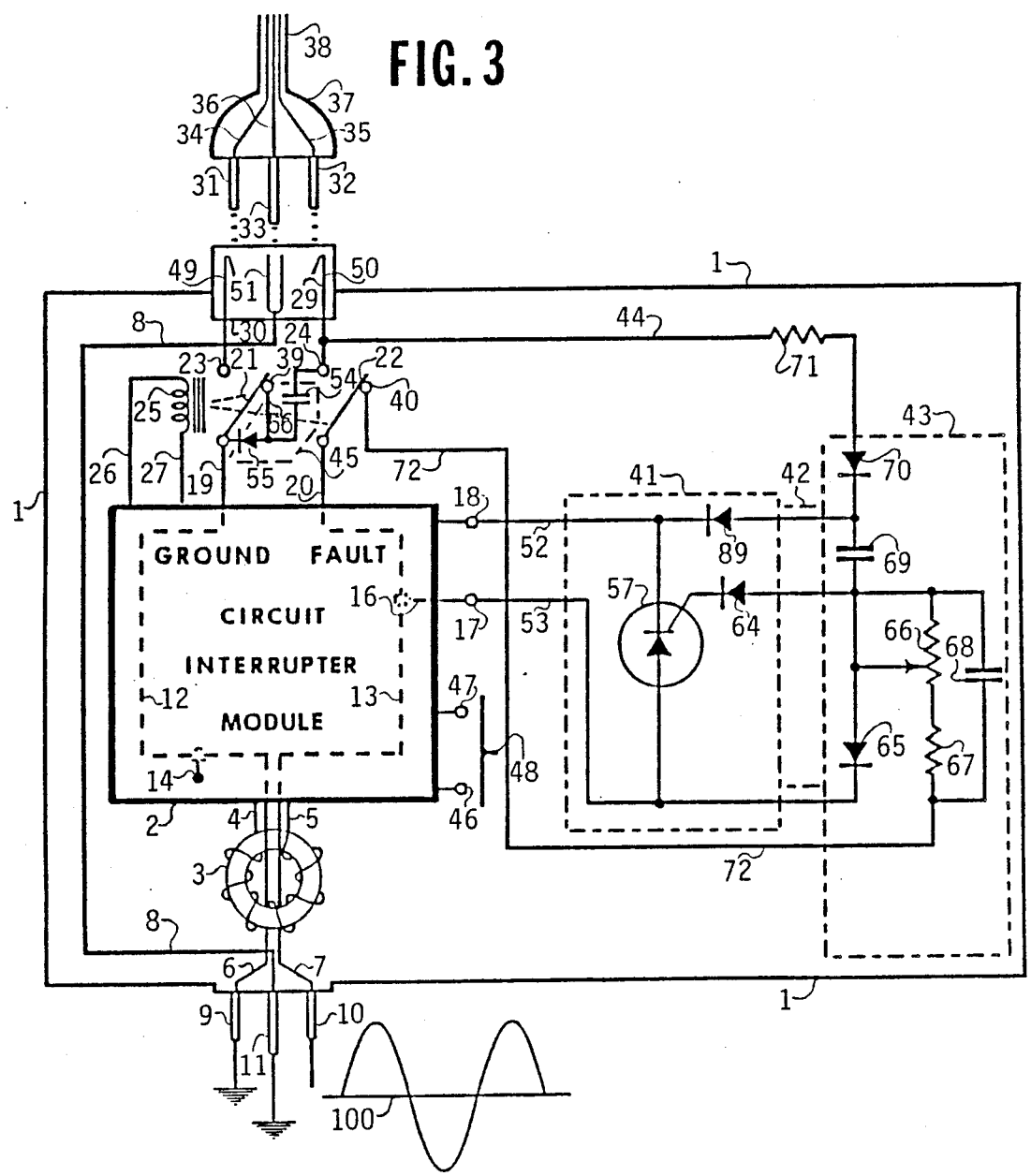
FIG. 3 is a schematic diagram of the second more specific embodiment of circuitry to provide a safe corporated means of providing automatic resetting of a GFCI in accordance with this invention and in which the coupling means comprises conductive connections.

Turning now to FIG. 3, it should be noted that components referenced as 100, 1 through 14, and 16 through 57 have substantially the same location connection, and function as in FIG. 2. An additional component, rectifier 64 is included in controlled reset switch 41 to protect the gate of SCR 57, to block reverse gate voltage on the negative half cycle of anode supply voltage. The current limited ground fault sensor in this instance comprises the gate connected control circuit of SCR 57 and includes a rectifier 65 having its anode connected to the anode of gate protective rectifier 64, and its cathode connected to the anode of SCR 57 or directly to reset terminal 17, or other similar supplier of current from source 100. The fault sensor 43 also includes a capacitor 68 connected in parallel with a series connected variable resistance 66 and fixed resistance 67 and the combination also connecting the anode of rectifier 64 with a supplier of current from source 100 which is in this instance contact 40 connected to lead 20 by GFCI relay armature contact 22. This connection through the relay contacts, rather than an optional direct connection to a source of anode voltage, disconnects the path of triggering current to the gate until tripping of the GFCI and assists in the necessary interruption of the current path across reset terminals 17 and 18. This arrangement also causes a reduction in the difference between the lessor initial sensitivity to fault and the greater sensitivity to fault that results once the SCR has reacted to substantially reduce current flow across reset terminals 17 and 18. If the difference were extreme, the far greater "holding" sensitivity could have the undesirable effect of maintaining the tripped state in the presence of much less than hazardous fault conditions as previously discussed in regard to FIG. 2.

The first element or current limited ground fault sensor 43 also includes a capacitor 69 and rectifier 70. The capacitor 69 is connected on one side to the anode of rectifier 64 and on the other to the cathode of rectifier 70, and to the cathode of SCR 57 in the second element 41 through rectifier 89, which is shown as a part of the second element 41, but which could just as well be included as a part of the first element 43, as could rectifier 64. In this instance, the coupling of the first element 43 with the second element 41 made through the control coupling element 42 is of an electrically conductive nature. The coupling of the first element 43 with the load circuit is accomplished by connection of the anode of rectifier 70 to lead 29 by means of coupling lead 44, and may be made through an optional current limiting resistance 71. Such a current limiting resistance 71, is of value only in the event of a bi-directionally conducting failure of SCR 57, a conductive failure of capacitor 69, a failure of both of the rectifiers 70 and 89, or any other conductive failure that would deliver a hazardous level of current from the source to the load circuit after it is disconnected from the source by the GFCI.

It should be noted that the current limited sensor circuit can be employed without connecting the capacitor 69 to the cathode of SCR 57 through rectifier 89 or by any other means, but if this is done, rectifier 70 must also be eliminated, and capacitor 69 connected directly to optional current limiting resistance 71 or to lead 44.

In FIG. 3, the SCR is as for FIG. 2, resistances are ¼ to ½ watt with 67 having a value of 470K ohm, 66 having a value of approximately 500K ohms, and the optional resistance 71, having a value of approximately 33K ohms.

The capacitor 69 should be approximately 0.033 to 0.047 Mfd. The capacitor 68 should be approximately 0.02 Mfd, and tends to be a more critical value. Both capacitors should have a minimum rating of 250 WVDC.

In operation, the SCR is triggered into conduction by voltage supplied through resistances 67 and 68, and capacitor 68 when connected to the source 100 through lead 72 contacts 22 and 40, leads 20, 13, etc., and triggering level will be normally reached at the gate when capacitor 69 is sufficiently charged in the forward direction of SCR 57. A subsequent discharge of capacitor 69 or charge in the opposite direction is accomplished through rectifier 65 which is continuously connected to source 100 through reset terminal 17. After tripping of the GFCI, opening of the load circuit, including leads 34 and 35, and closure of contacts 21 and 39, and 22 and 40, a brief pathway to ground exists through capacitor 54 in the momentary ground fault simulator element 45 to discharge capacitor 69 and provide for an initial non-conductive state in SCR 57. If another pathway to ground of sufficiently low impedance exists in the load circuit, capacitor 69 will continue to be discharged or to be charged in the opposite direction at a rate greater than it can be charged in the forward direction, and SCR 57 will remain non-conductive, and the GFCI will not be reset. When no such pathway to ground exists, capacitor 69 can be charged in the forward direction, SCR 57 can be triggered into conduction, and the GFCI reset.

Figure 4:
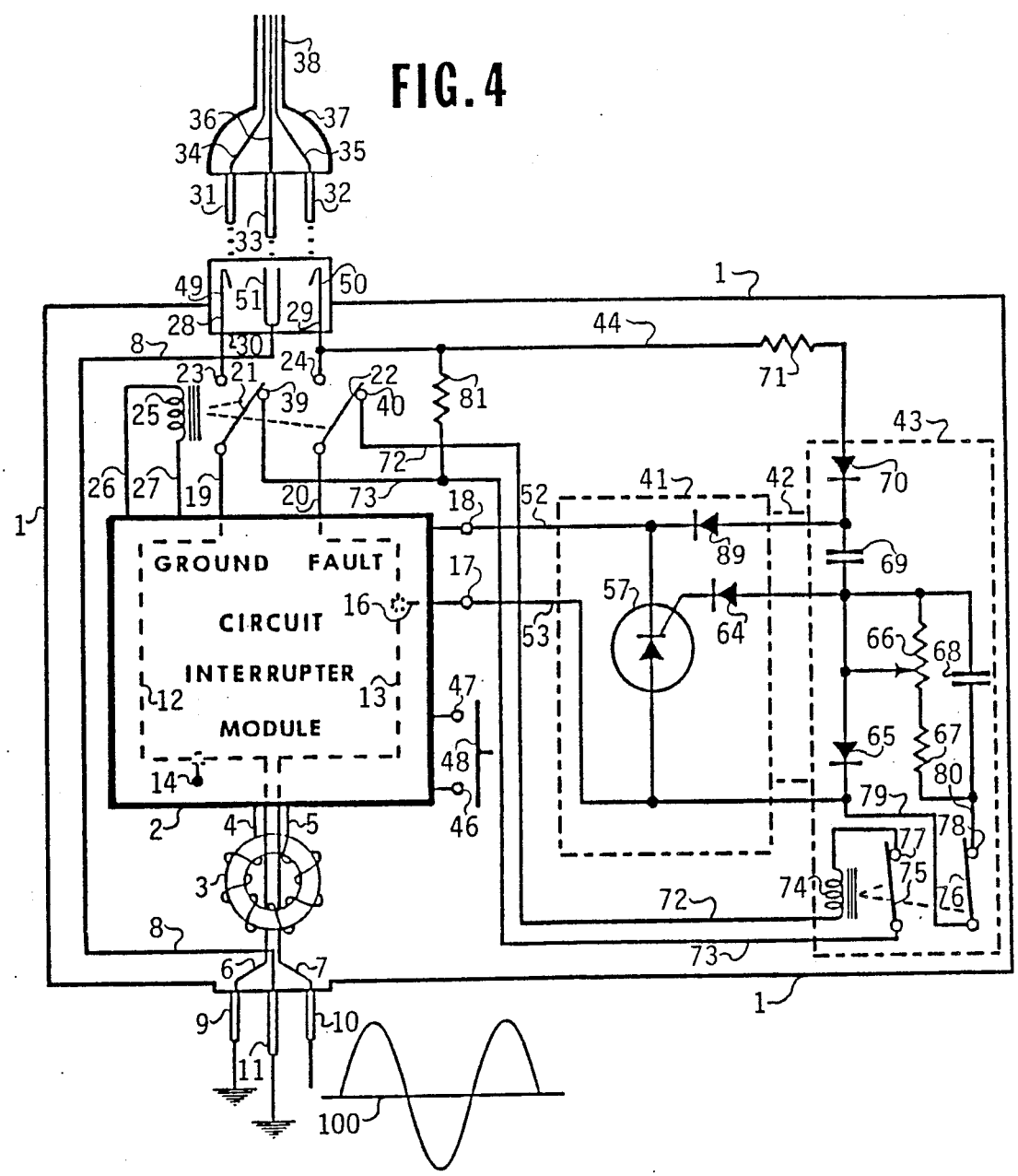
FIG. 4 is a schematic diagram of the third more specific embodiment of circuitry to provide a safe incorporated means of providing automatic resetting of a GFCI in accordance with this invention in which a relay is employed for audible indication of fault and to affect sensitivity parameters.

In FIG. 4, components referenced as 100, 1 through 14, 16 through 44, and 46 through 53, have substantially the same location and function as in FIG. 3. In this instance, lead 72 from GFCI relay contact 40 is connected to one side of the coil 74 of a small D.P.S.T., normally closed relay with contact pairs 75 and 77, and 76 and 78, and the other side of the coil is connected through small relay contacts 75 and 77, and lead 73 to GFCI relay contact 39. The series connected resistances 66 and 67 which were connected in parallel with capacitor 68 contacts 75 and 77, and lead 73 to GFCI relay contact 39. The series connected resistances 66 and 67 which were connected in parallel with capacitor 68 to source 100 through lead 72 and contact 40 in FIG. 3, are now connected to said source 100 through lead 78, small relay contacts 78 and 76, lead 79 and 53, etc. When the GFCI relay coil 25 is de-energized and the load disconnected from source 100 by the opening relay contacts, the closing contact pairs 21 and 39 and 22 and 40 supply power from source 100 to small relay coil 74 through its own normally closed contacts 75 and 77 which causes the relay to open and close rapidly in buzzer fashion and open and close its contacts 76 and 78 carried on the same armature. This effect provides an audible indication of tripping, greatly facilitates the initial current path interruption across reset terminals 17 and 18, and causes a more controllable difference between the lesser initial sensitivity to fault and the greater sensitivity to fault that exists after SCR 57 has been rendered substantially non-conductive (holding sensitivity). In this instance, the momentary ground fault simulator is not employed, but resistance 81 connecting lead 44 with a source of ground potential through contacts 39 and 21 assists in achieving an initial break in the current path between reset terminals 17 and 18 when tripping is not due to a true fault or the tripping fault is very brief. Since the rate of contact opening and closure is dependent upon the physical characteristics of the small relay, care should be taken in the selection to maximize the effect and some means of providing adjustability such as a variability in spring tension could be of value.

Figure 5:
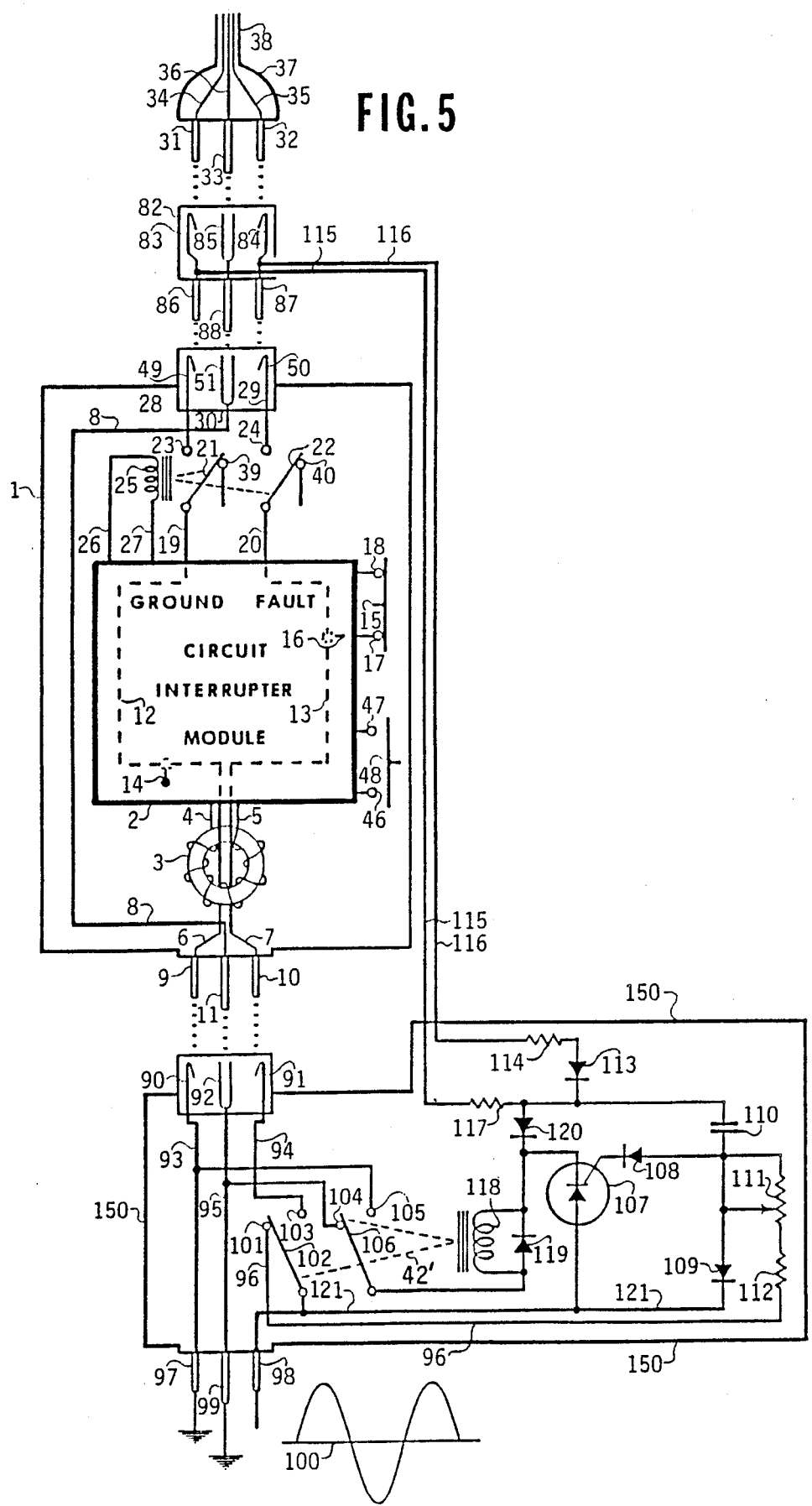
FIG. 5 is a schematic diagram of the fourth embodiment of circuitry to provide a safe means of resetting a GFCI wherein power to the GFCI is interrupted and restored to accommodate reset and is a design intended as an add-on device for attachment to a plug-in portable GFCI. While the automatic reset circuits of FIGS. 1 through 4 are shown as distinguishable additions to the GFCI circuitry, it should be understood that they may also be incorporated in manufacture into the printed circuit design of the GFCI module circuitry.

Turning finally to FIG. 5, it will be noted that components 1 through 14, and 16 through 40, and 46 through 51 are shown in FIGS. 1 through 4, having substantially the same location, and with the addition of normally closed pushbutton switch 15 across the reset terminals 17 and 18, represent an unmodified conventional ground fault circuit interrupter connected to a load circuit plug and cable and to an A.C. power source. In this instance the automatic reset circuit resides in its own enclosure 150, but still functions to interrupt and restore the current pathway to the ground fault circuit interrupter module through reset terminals 17 and 18, and switch 15, by interrupting current to the entire GFCI unit after tripping of the GFCI has disconnected the load from source 100. GFCI plug terminals 9, 10, and 11, engage automatic reset receptacle terminals 90, 91, and 92, respectively, with grounded and grounding terminals 90 and 92 feeding directly through leads 93 and 95 to grounded and grounding terminals 97 and 99, respectively. The hot side current pathway to plug contact 10 of the GFCI comprising the reset circuit plug contact 98, leads 121 and 94, and receptacle contact 91 is interrupted by normally open contacts 102 and 103. Lead 121 supplies current from the hot side of source 100 to the anode of SCR 107 and through 107, when made conductive, to relay coil 118 equipped with "free wheeling" diode 119. In accord with this invention, and in order to provide an assurance of correct or non-hazardous wiring in a receptacle into which plug contacts 97, 98, and 99 will be inserted, return current through coil 118 to the ground side of source 100 is given two pathways. Initially, when coil 118 is not energized, contacts 104 and 106 provide the pathway to lead 95, and thus to grounding plug contact 99. If no third wire grounding is available, the coil cannot be energized.

If grounding pathway is intact, the coil can be energized and immediately upon energizing will close contacts 105 and 106, and transfer the ground side pathway to lead 93, and thus to grounded neutral plug contact 97. If hot and neutral are reversed in the receptacle, no energizing will take place. If hot and grounding are reversed, the coil will be energized only when contacts 104 and 106 are closed. No continuous current pathway will be provided, and the resulting buzzer action of the relay will give audible indication of the receptacle error. If grounded and grounding connections are reversed, energizing will occur, but while this latter receptacle wiring error is of some importance, it does not constitute an immediate hazard with reference to operation of the invention. In this arrangement, the relay comprising coil 118 and contacts 101 through 106 should be selected to offer a rapid transfer from grounding to grounded neutral connection to avoid de-energizing during transfer. It will be noted that resistances 111 and 112, rectifier diodes 108, 109, 113, and 120, and capacitor 110 perform substantially the same function as resistances 66 and 67, rectifier diodes 64, 65, 70, and 89, and capacitor 69 in FIGS. 3 and 4, in comprising an SCR gate control circuit capable of reacting to a fault in the load circuit which includes leads 34, 35, and 36 in plug 37 and cable sheath 38. In this instance, the controlled SCR 107 with its gate protective rectifier diode 108 does not directly perform the reset switching function as in FIGS. 3 and 4, but becomes part of the first element or current limited ground fault sensor. The relay coil 118 with its free wheeling diode 119 also becomes part of the first element with the relay contacts 102 and 103 comprising the controlled reset switching function of the second element in interrupting and restoring power to the GFCI module. A magnetic field of influence indicated by dotted line 42' generated by the coil 118 with its core becomes the control coupling or third element of the automatic reset circuit. While current limiting resistance 114, approximately 22K ohms resembles that of 71 in FIGS. 3 and 4, it is not optional.

Resistance 117, approximately 100K ohms, connects the sensor element to the grounded neutral load lead 34 through contact 31 of plug 37, contact 83 of receptacle-plug combination 82, and lead 115, and serves to assist in assuring initial reset interruption in the event of very brief tripping and in place of the fault simulator. Resistance 114 is connected by lead 116 to contact 84 in receptacle-plug combination 82 and thus to contact 32 and load lead 35 in load plug 37 and cable sheath 38. Load plug contacts 31, 32, and 33 feed through contacts 83-86, 84-87, and 85-88 of receptacle-plug. combination 82 to the GFCI receptacle contacts 49, 50, and 51, respectively. Relay contacts 101, 104, 105, and 106, carry only the current demanded by the automatic reset circuit, and may be small. While the 102 and 103 contacts enjoy dry switching conditions and are designed to close before the relay of the GFCI closes to connect the load and to open after the relay of the GFCI opens to disconnect the load, to avoid arcing problems, they must be large enough to carry the current for which the GFCI is rated. While the sensor element in this instance includes the gate control circuit comprising capacitor 110, resistances 111 and 112, and rectifier 109, it should be understood that SCR 107 could be controlled by other means such as a photoconductive cell as outlined in FIG. 2 wherein a light source is employed in the sensor circuit.

While this invention has been described with respect to certain specific embodiments, it will be appreciated that many modifications and changes may be made by those skilled in the art without departing from the inventive concepts or spirit of this invention. It is intended, therefore, by the appended claims to cover all such modifications and changes as fall within the true spirit and scope of the invention.

What is claimed as new and what is desired to be secured by Letters Patent of the United States is:

1. In a ground fault circuit interrupter having a ground fault sensor means and load current switching means responsive to said sensor means to supply a load current from an alternating current source to a load circuit and to interrupt said load current when a ground fault current flow exceeding a predetermined magnitude in the load circuit is sensed by said sensor means, said sensor means being incapable of sensing faults between the ungrounded and grounded conductors of said load circuit, the improvement comprising ground fault detecting means for determining the presence of a ground fault after interruption of load current by said switching means and providing an output signal determined by the impedance of said ground fault so detected, controlled reset means operably connected by coupling means to said detecting means and being responsive to said output signal for automatically resetting said ground fault circuit interrupter to supply said load current to said load circuit when the impedance of a ground fault would limit a load current through said ground fault to a magnitude which does not exceed a predetermined non-hazardous level.

2. The circuit interrupter as defined in claim 1 in which said sensor means includes a differential current transformer.

3. The circuit interrupter as defined in claim 2 in which said ground fault detecting means includes an other sensor means.

4. The circuit interrupter as defined in claim 3 wherein said other sensor means includes a circuit means for causing a safely limited sensing current to be made available in said load circuit for passage to ground through said ground fault during the time load current to said load circuit is interrupted by said switching means.

5. The circuit interrupter as defined in claim 4 in which the passage to ground of said sensing current through said ground fault results in a signal representative of the magnitude of the flow of said sensing current and indicative of the flow of said load current which normally would pass through said ground fault if load current were present in said load circuit.

6. The circuit interrupter as defined in claim 4 wherein said circuit means includes a resistance for limiting said sensing current.

7. The circuit interrupter as defined in claim 3 in which said interrupter, after interruption of said load current to said load circuit by said switching means, is resettable by interruption and reestablishment of current flow through said controlled reset means or by a substantial diminishment and reestablishment in the level of said current flow through said controlled means which is effectively equivalent to said interruption and reestablishment.

8. The circuit interrupter as defined in claim 7 in which said other sensor means includes an emission source, said coupling means includes an emission pathway and said controlled reset means includes an emission sensitive circuit for diminishing said current flow passing through said controlled reset means in response to emission from said emission source.

9. The circuit interrupter as defined in claim 8 in which said emission sensitive circuit included in said controlled reset means includes a thyristor.

10. The circuit interrupter as defined in claim 7 further comprising a thyristor and a gate control circuit for said thyristor, said other sensor means including said gate control circuit of said thyristor, said coupling means including an electrically conductive pathway and said controlled reset means including said thyristor.

11. The circuit interrupter as defined in claim 7 further comprising a thyristor, a gate control circuit for said thyristor and a relay, said other sensor means including said gate control circuit of said thyristor and said relay, said coupling means including an electrically conductive pathway said controlled reset means including said thyristor.

12. The circuit interrupter as defined in claim 7 including means for producing a momentary ground fault simulation with a current of sufficient magnitude and duration to assure the effective interruption of current through said reset means required for resetting of said circuit interrupter and to permit automatic resetting of said circuit interrupter when current interruption to said load circuit is initiated by other than a ground fault condition or by a fault that is of insufficient magnitude and/or duration.

13. The circuit interrupter as defined in claim 12 in which said load current switching means is a relay and in which said means for producing a momentary ground fault simulation includes said relay, a capacitor and two rectifiers, said capacitor being connected in series with one of the two said rectifiers and connected by the relay to receive current from said source for charging in one direction when said relay is energized to supply current to said load circuit from said source, said relay acting to shunt said one rectifier to permit the capacitor to discharge and to be recharged in the opposite direction through the other of the two rectifiers when said relay is deenergized to interrupt the supply of current to said load circuit from said source, said capacitor being connected to said sensor means and said discharge and recharge providing a momentary passage of current to said sensor means that simulates the current that might be passed through a ground fault.

14. A ground fault circuit interrupter as defined in claim 13 in which the other of the two said rectifiers is included in said other sensor means.

15. In a ground fault circuit interrupter having a ground fault sensor means including a differential current transformer and having a load current switching means responsive to said sensor means to supply a load current from an alternating current source to a load current utilization device, the improvement comprising an other sensor means to determine ground fault conditions after interruption of said load current by said switching means in response to said sensor means, circuit means responding to said other sensor means for automatically resetting said interrupter whenever said other sensor means determines an absence of ground fault in the circuitry of said load current utilization device or determines that conductivity of a ground fault in said circuitry does not exceed a predetermined level generally recognized as non-hazardous.

16. A ground fault circuit interrupter as defined in claim 15 in which said other sensor means includes means to pass a limited sensing current into said circuitry of said load current utilization device after said load current to said device from said source has been interrupted by said switching means.

17. In a ground fault interrupter system, having an electrically resettable ground fault circuit interrupter including a first ground fault sensor for supplying ground fault protected electrical power from a source to a load current electrical utilization device, the improvement including a second sensor for determining the magnitude or absence of a ground fault in said utilization device or the circuit connecting such device to said circuit interrupter, a controlled reset switch and a control coupling that enables said second sensor to control said reset switch so that said circuit interrupter will be automatically reset when said second sensor senses no fault or determines that a fault condition is non-hazardous, but will not be reset when said second sensor senses a fault condition which would allow a fault current flow exceeding a predetermined level.

18. The ground fault interrupter system as defined in claim 17 wherein said circuit interrupter includes a pair of reset switch terminals, said reset switch being connected across said reset switch terminals.

19. The ground fault interrupter system as defined in claim 17 in which said controlled reset switch is connected between said power source and said ground fault circuit interrupter to interrupt and restore power to said circuit interrupter for resetting same.

20. The ground fault interrupter system as defined in claim 17 wherein said second sensor includes a magnetic field and said reset switch includes means responsive to said magnetic field.

21. The ground fault interrupter system as defined in claim 20, wherein said means responsive to said magnetic field is a relay armature.

22. The ground fault interrupter system as defined in claim 20 wherein said means responsive to said magnetic field includes a semiconductor.

23. The ground fault interrupter system as defined in claim 22 wherein said semiconductor is a Hall effect switch.

* * * * *